July 22, 1969  R. LEHRER  3,457,478
WOUND FILM CAPACITORS
Filed Oct. 26, 1967
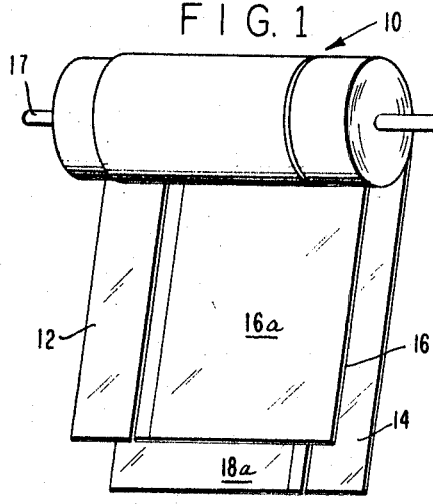
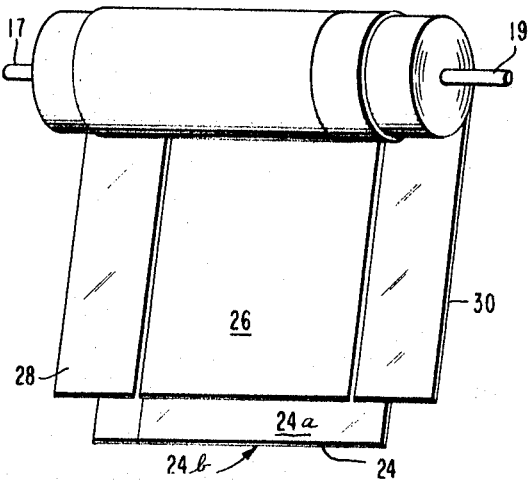
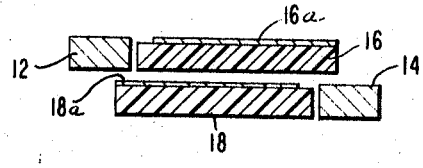
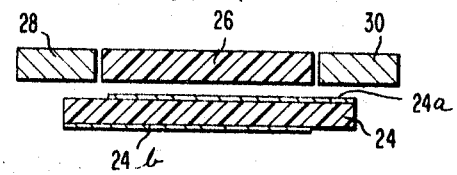
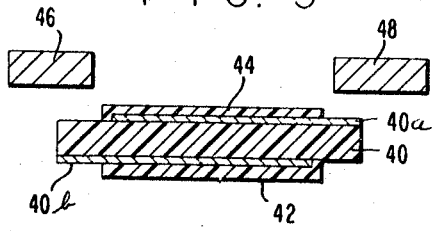
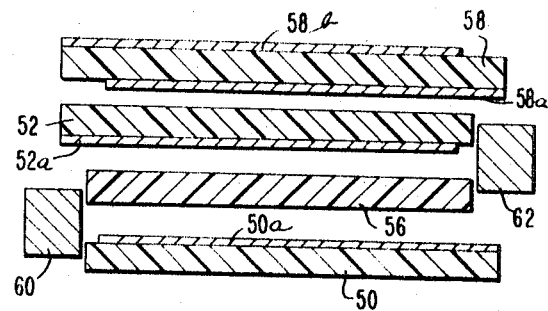
INVENTOR
ROBERT LEHRER
BY
ATTORNEY United States Patent Office 3,457,478
Patented July 22, 1969

3,457,478
WOUND FILM CAPACITORS
Robert Lehrer, Brandywood, Wilmington, Del., assignor to E. I. du Pont de Nemours and Company, Wilmington, Del., a corporation of Delaware
Filed Oct. 26, 1967, Ser. No. 678,224
Int. Cl. H01g 3/17, 1/14
U.S. Cl. 317—260        4 Claims

ABSTRACT OF THE DISCLOSURE

A wound capacitor of metallized dielectric has terminal connections formed of wound metal foils.

Background of the invention

Rolled electric capacitors of metallized dielectric are more compact and smaller than rolled capacitors of film-foil construction for the same capacitance. However, the problem of connecting the electrical leads to the metallized surface has limited the use of these capacitors. One method of connection is to spray metal on the edges of the capacitor. However, it is difficult to insure good electrical contact with the barely exposed metallized edge. In addition, the sprayed metal commonly is of different composition from the metallized layer and corrosion can result from the contact of the dissimilar metals.

Summary of the invention

In accordance with the present invention, wound capacitors of metallized dielectric are provided with metal edge foils wound into the structure. The metal edge foils extend to or beyond the edges of the convolutely wound dielectric. With the foils extending beyond the edges, those foils can serve as terminals or additional terminals can readily be attached to them. With foils terminating at the edge of the dielectric, the large amount of foil edge present facilitates soldering of conventional terminals thereto but with stronger bonds than heretofore experienced.

The invention will be described in conjunction with the attached drawings, in which:

FIGURE 1 is a perspective view of a partially unrolled capacitor constructed in accordance with this invention;

FIGURE 2 is a section of the capacitor shown in FIGURE 1;

FIGURE 3 is a perspective view of a second, partially unrolled capacitor of the invention;

FIGURE 4 is a section of the capacitor of FIGURE 3;

FIGURE 5 is a section of a capacitor of two-side metallized dielectric base film; and FIGURE 6 is a section of a combination of one-side and two-side metallized films structures.

Referring now to the drawings in FIGURE 1 there is shown a capacitor 10 that includes metal foils 12 and 14 wound with dielectric films 16 and 18. The dielectric films are metallized on their top sides to provide metal layers 16a and 18a which serve as the capacitor plates in the final structure. Metal layers 16a and 18a do not extend to both edges of the dielectric film, but rather a margin of uncoated surface is provided on each metallized dielectric surface at one side edge thereof.

As is evident, especially in FIGURE 2, metal foils 12 and 14 each have the same thickness as the combined metallized layer and dielectric film adjacent which each foil is placed. For example foil 12 is essentially the thickness of the dielectric film 16 and its metallized layer 16a, and is placed to abut the side edge of dielectric film 16 where the margin or surface free from metal exists. Foil 14 is at the other side edge of the assembly and is of a thickness essentially equal to that of dielectric film 18 and its metal layer 18a. The edge margins or areas free from conductive metal on the surface of the dielectric film avoid inadvertent shorting of the resulting capacitor. The foil 12 contacts the metallized layer 18a and extends beyond the edge of the rolled-up dielectric sheet 18 to provide a surface for the subsequent attachment of an electrical lead. Similarly roll 14 contacts the metallized surface 16a of the dielectric sheet 16, when wound to the roll form, and also extends beyond the edge of the roll so that the second lead can be attached. The split arbor 17 and 19 (FIGURE 1) is used to wind the capacitor preform by a conventional mechanism (not shown). Since the foils 12 and 14 are substantially the thickness of the corresponding dielectric films 16 and 18, as above noted, there is no bulging or distortion of the capacitor resulting upon use of these foils.

The wound capacitor structure can then be further modified for use in accordance with methods known in the art. For example, it is common practice to heat the rolled preform in order to stabilize the electrical characteristics of the completed capacitor and this heating may shrink slightly the dielectric film. Such shrinkage improves the contact between the foils and metallized surfaces and locks the foils firmly in place in the structure. Further, the capacitor roll can be impregnated with dielectric material of liquid or solid type, as for example, mineral oil, castor oil, mineral wax, chlorinated aromatic compounds, or other suitable dielectric material. The conductor leads can be attached with solder or a combination of sprayed metal followed by solder, or a conductive cement, all such methods being well known. In addition, the capacitor unit can be enclosed in a casing and/or dipped in a hardening dielectric material to seal the capacitor from dust and undesirable atmospheres.

In the foregoing embodiment as well as others described hereinafter, the materials used, methods of winding and the like all can be in accord with presently known practices. For example, the dielectric films can be composed of any suitable insulating material which can be metallized such as paper, synethetic resin such as molecularly oriented polyester film, ribbon glass, reconstructed mica or other dielectric material, all of which are well-known in the art. The dielectric layers can also be provided, at least in part, by application of silicon or aluminum oxides by vacuum evaporation techniques, rather than using polyester or other film as herein illustrated. The metallized layers, commonly less than one micron thickness, can be any suitable conductor such as aluminum, zinc, copper, nickel or tin. The application of the metallized layers to the deielectric film or support film can be by any process such as vapor deposition, chemical deposition, or other metal depositing methods known in the art. For example, a coating of aluminum can be applied to a plastic substrate such as biaxially oriented heat-set polyethylene terephthalate film, which film can have a thickness from 0.08 to 5.0 mils, by evaporating the aluminum in a vacuum chamber. The thickness of the aluminum might be from 0.01 to 1 micron thick, and the thickness range from 0.02 to 0.1 micron being preferred to make a self-healing capacitor. Thickness greater than 1 micron can be applied; however, if greater thicknesses are used the thickness of the conductive foils should be adjusted correspondingly in order to provide a neat, compact, rolled capacitor. Edge margins can be provided during metallization by suitable masks over the areas to remain metal free. The margins can be provided by other methods known in the art such as oil printing before deposition or by removal of metal in the margin area. It is generally preferred to use a conductive foil of the same metal as the metallized layers, for example, aluminum foil with a metallized aluminum layer. However, combinations can be used. For example, a fusible alloy foil would provide the electrode contact and at the same time allow the conductor lead to be attached by heating without an intermediate solder application step.

Another embodiment is shown in FIGURES 3 and 4 wherein a two-side metallized dielectric film is used. The structure includes a first dielectric film 24 metallized on both surfaces to provide metal layers 24a and 24b. As before edge margins are provided on each surface to avoid shorting of the capacitor structure. A second dielectric film 26 is placed on metallized layer 24a, and separates the metallized layers from contact with one another in the wound state. Film 26 can be of the same or different thickness from that of dielectric film 24. Two conductive foils 28 and 30 substantially abut against dielectric film 26 and are of the same thickness as that film. One foil 30 rests in contact with metallized layer 24a. Foil 28 is spaced from the other edge of that layer by dielectric film 26; in the wound state (see FIGURE 3), foil 28 contacts metallized layer 24b. As in the structure of FIGURE 1, foils 28 and 30 extend beyond the dielectric when wound and provide a large surface which is accessible for application of leads. Numbers 17 and 19 are parts of the winding arbor conventionally used to form these structures.

Another embodiment is shown in FIGURE 5. In this

The invention will be described further in conjunction with the following example.

Example 1

Capacitor preforms were prepared on a Barton automatic winder. Two webs of one side metallized Mylar polyethylene terephthalate film 0.25 mil thick and 1 inch wide were wound with two webs of ¼ inch wide 0.25 mil thick aluminum foil. The dielectric webs were vacuum metallized with aluminum to a thickness of about 400 Angstroms and the edge margin was 1/16 inch wide. The configuration was that shown in FIGURES 1 and 2. Capacitor preforms were also wound of the same metallized film without the aluminum foils. The winding performance, speed, and low reject rate were essentially the same for both structures.

A third set of capacitor preforms was prepared from two films of 0.25 mil polyethylene terephthalate film 1 inch wide which were not metallized. Rather, the plates used were two aluminum foils 0.25 inch thick and 1 inch wide, wound with the dielectric. All three sets were heat treated for 2 hours at 150° C. in an air oven. The metallized construction without edge foils was sprayed on the ends with Sprababbit A (Metco Corp.) in order that electrical connections could be made. The three sets of capacitors obtained are compared in table below.

TABLE

| Sample type | Film thick., mils | Film width (in.) | Weight (gms.) | diameter (in.) | Total body length (in.) | Active body length (in.) | Capacitance (1 kc) (mfd.) | Capacitance Active volume | mfd./in.³ |
|---|---|---|---|---|---|---|---|---|---|
| Metallized spray terminated | 0.25 | 1 | 1.441 | 0.30 | 1.10 | 0.84 | .5277 | 8.88 | |
| Metallized foil terminated | 0.25 | 1 | 1.786 | 0.30 | 1.48 | 0.84 | .5256 | 8.85 | |
| Film/foil | 0.25 | 1 | 5.443 | 0.48 | 1.28 | 0.72 | .4958 | 3.81 | | structure, the support dielectric film 40 is metallized on two sides to provide layers 40a and 40b. These metallized layers are covered by dielectric layers 42 and 44 which can be applied after metallization by techniques such as solvent coating or melt application. End margins are left at each end of the dielectric coatings 42 and 44 and expose portions of the metallized layers 40a and 40b. The conductive foils 46 and 48 contact, respectively, metallized layers 40b and 40a, when wound. The thickness of foils 46 and 48 correspond substantially to the combined thicknesses of dielectric layers 44 and 42 to provide a neat, compact foil structure.

When it is desirable to have foils thicker than one dielectric layer, a structure such as that of FIGURE 6 may be used. This can be desirable when the dielectric spacers to be employed are less than ¼ mil requiring correspondingly thin foils. Thin metal foils are difficult to handle without creasing or breaking. Thicker foils are used as follows: Dielectric film 50 and 52 metallized on one surface each and having end margins are provided. A first uncoated dielectric member 56 is located between the opposed metallized layers 50a and 52a and spaces those layers. Another dielectric sheet of film 58 is provided with metallized layers 58a and 58b and is placed with one of its metallized layers, e.g. 58a, adjacent the uncoated side of dielectric 52. Thick metal foils 60 and 62 complete the unit, foil 60 abutting the edges of both dielectric film 50 and 56, while foil 62 abuts the ends of dielectric 56 and 52. These foils each are substantially the combined thickness of the two dielectric members they abut. The usual margins are provided as shown to avoid shorting. In the rolled or wound form, it will be apparent that foil 60 contacts metallized layers 52a and 58b while foil 62 contacts layers 50a and 58a. Thus in this structure the basic principle of the discovery is utilized providing the ease of applying strong terminals and very thin films can be used, and the thicker foils avoid undue wrinkling or like problems that can occur with very thin foils.

The principle just described can also be used in the absence of the dielectric having both surfaces metallized.

The active body length is that portion of the total length which contributes to capacitance. In the case of the foil terminated capacitors, the total length will depend upon the edge foil width. In the example the foil was ¼ inch but it may be narrower. The capacitance per unit active volume (final column) is essentially the same for the spray terminated and foil terminated capacitors and these two structures have a ratio better than twice as large as the film/foil construction.

In other tests of the structure of the invention terminals were attached to the edge foils by soldering. Upon testing using an Instron tensile testing machine, it was found that the solder attachment to the edge foil was stronger than those made with spray terminated metallized capacitors.

In still other tests, the dissipation factor, which is a measure of termination efficiency, was determined. Capacitor preforms were prepared in accordance with Example 1. The dissipation factor, measured at 1,000 cycles per second and at 23° C., averaged 0.58% for the foil terminated capacitors while the average for metallized spray terminated capacitors was 0.67%. The edge foil terminated capacitors of this invention showed the desirable lower dissipation factor.

Many other embodiments within the scope of this discovery should now be evident and provide particular advantages. In addition changes can be made from the details shown without departing from the scope hereof. For example, the end metal foils can, if desired, be wound wholly within the structure rather than extending beyond the edges as shown. A capacitor wound of this construction can have the leads attached by the method of Helda and Walker, U.S. Patent No. 3,071,842, by piercing or by other methods known in the art. If the foil were not present, the reject rate would be high because of poor contact between the very thin metallized electrode and the lead wire.

It is also possible, in view of the structures of this invention, to wind two or more capacitors on an arbor at the same time (e.g. of the type of FIGURES 3 and 4).

When wound, the capacitors are severed along a line dividing a metal foil. Other changes that are possible will be apparent to the artisan.

What is claimed is:

1. A wound electrical capacitor comprising layers of dielectric, metallized layer electrodes and metal foils, a first of said metallized layers being spaced away from a first side edge of the capacitor and another being spaced away from the second side edge of the capacitor, a first metal foil adjacent but not contacting the first metallized layer and in electrical contact with said second metallized layer, and a second metal foil adjacent but not contacting said second metallized layer and in electrical contact with said first metallized layer, said metal foils each extending beyond the side edges of the layers of dielectric and metallized layers.

2. A wound electrical capacitor of convolutely wound layers comprising close wound first and second elongated members and first and second elongated conductive foils, each of said members comprising a dielectric layer and a metallized conductive layer integral with one surface of the dielectric layer throughout all but a marginal portion of its width, said marginal portions of adjacent dielectric layers being at opposite side edges of said capacitor, said members being arranged with the uncoated dielectric surface of said first member in contact with the conductive layer on said second member and said first and second members being laterally offset from one another, a first elongated conductive foil of about a thickness of said first member and its conductive layer located laterally adjacent said first member at its side which is free from metallized conductive layer and supported on a portion of the metallized conductive layer of said second member, and a second elongated conductive foil of about a thickness of said second member and its conductive layer located laterally adjacent said second member on a side edge opposite from said first foil.

3. A wound electrical capacitor according to claim 2 in which said metal foils each extend beyond the side edges of the dielectric member at that side of the capacitor.

4. A wound electrical capacitor comprising a pair of convolutely wound metallized layer-containing dielectric films laterally offset from one another with said metallized layers facing each other, a third dielectric film between said metallized layers and having a width smaller than that of said pair of dielectric films in an amount equal to about half the lateral offset of said pair of dielectric films, a first metal foil abutting one end of said third dielectric film and a first of said pair of metallized layer-containing films and in electrical contact with metallized layer on the second of said pair of metallized layer-containing film, and a second metal foil abutting the other end of said third dielectric film and said second of said pair metallized layer-containing dielectric films and in electrical contact with said metallized layer on said first dielectric film.

References Cited
UNITED STATES PATENTS 3,303,550   2/1967   Banzhof _____ 317—258 X E. A. GOLDBERG, Primary Examiner U.S. Cl. X.R.

317—242